(12) United States Patent
Melzer et al.

(10) Patent No.: US 7,431,784 B2
(45) Date of Patent: Oct. 7, 2008

(54) METHOD AND APPARATUS FOR PRODUCING DATA CARRIERS EQUIPPED WITH AN INTEGRATED TRANSPONDER

(75) Inventors: Roland Melzer, Schewlm (DE); Rainer Melzer, Schewlm (DE)

(73) Assignee: Melzer Maschinenbau GmbH (DE)

( * ) Notice: Subject to any disclaimer, the term of this patent is extended or adjusted under 35 U.S.C. 154(b) by 218 days.

(21) Appl. No.: 10/267,103

(22) Filed: Sep. 30, 2002

(65) Prior Publication Data

US 2003/0089444 A1   May 15, 2003

Related U.S. Application Data

(63) Continuation of application No. PCT/DE01/01380, filed on Apr. 6, 2001.

(51) Int. Cl.
*B32B 41/00* (2006.01)
(52) U.S. Cl. .......................... 156/64; 156/299; 156/300; 156/290; 156/291
(58) Field of Classification Search .................. 156/64, 156/299, 300, 290, 291, 293, 295; 340/571, 340/572.1, 572.2, 572.3, 572.4, 572.5, 572.6, 340/572.7, 572.8, 572.9
See application file for complete search history.

(56) References Cited

U.S. PATENT DOCUMENTS

| | | | |
|---|---|---|---|
| 5,867,102 A | 2/1999 | Souder et al. | |
| 6,019,865 A | 2/2000 | Palmer et al. | |
| 6,237,217 B1 * | 5/2001 | Bohn et al. | 29/806 |
| 6,391,136 B1 * | 5/2002 | Stickelbrocks | 156/249 |
| 6,451,154 B1 * | 9/2002 | Grabau et al. | 156/300 |
| 6,520,544 B1 * | 2/2003 | Mitchell et al. | 283/70 |

FOREIGN PATENT DOCUMENTS

| | | |
|---|---|---|
| DE | 19722327 A1 | 5/1997 |
| DE | 19617537 C1 | 7/1997 |
| DE | 19827592 A1 | 6/1998 |
| DE | 19753500 A1 | 6/2000 |
| WO | WO 98/32099 | 7/1998 |
| WO | WO 99/00784 | 1/1999 |

OTHER PUBLICATIONS

International Preliminary Examination Report; Date completed Mar. 6, 2002.

* cited by examiner

*Primary Examiner*—George Koch
(74) *Attorney, Agent, or Firm*—Nikolai & Mersereau, P.A.; C. G. Mersereau

(57) ABSTRACT

A method for producing data carriers equipped with integrated transponders is disclosed in which the transponders are supplied in a transponder web and are covered on one side with a label, wherein the transponders are separated and aligned before being assembled with an associated label. The disclosure further includes an apparatus for producing data carriers equipped with an integrated transponder that includes a device for supplying a first web of labels and a device for supplying a web of transponders adjoining one another and includes a joining station for cutting and separating the transponders from the transponder web which divides the transponders from the web, separates them and transfers them individually to the label web.

26 Claims, 3 Drawing Sheets

METHOD AND APPARATUS FOR PRODUCING DATA CARRIERS EQUIPPED WITH AN INTEGRATED TRANSPONDER

This application is a continuation of PCT/DE01/01380, filed Apr. 6, 2001.

The invention relates to a method for producing data carriers equipped with integrated transponders, in which the transponders are supplied in a transponder web and are covered on one side with a label. The invention further relates to an apparatus for producing data carriers equipped with an integrated transponder, including apparatus for supplying a first web of labels and apparatus for supplying a first web of transponders adjoining one another.

Methods and apparatuses for the continuous production of self-adhesive labels equipped with transponders are known from practice, in which a first web of labels provided with an adhesive side is covered by a second web of transponders, which are supplied from an endless web, and the resulting web is covered with a double-sided adhesive on the side of the transponders facing away from the label. The known method permits the production of large numbers and high operating speeds, but is afflicted with a series of inadequacies. A first problem is that, in the case of the known method, it is not possible to separate defective transponders during continuous operation. As a result, the production of defective labels occurs, which is particularly disadvantageous when the labels have already been printed and personalized. The rejected goods have to be replaced by expensive reworking. A further disadvantage is that the double-sided adhesive is also applied to those areas of the webs which represent trim per se or project beyond the transponder and stick in any case. A further problem consists in the positioning effort in order to prevent one of the webs running astray during continuous operation. In addition, when supplying an endless strip of double-sided adhesive, contamination in the plant occurs rapidly, in particular in the event of disruptions, which lead to considerable downtime and outlay on maintenance. In addition, subsequent cutting of the resulting web is made more difficult because of the three layers which are always provided. Finally, a further problem is that, because of inaccuracies in the positioning of the transponders, the packing density of the endless web in which the transponders are wound up into a roll is low.

DE-A-198 27 592 describes a device for producing labels which are provided with transponders and in which security elements wound onto a supply roll, provided with an adhesive layer and arranged immediately adjacently on a protective film are transferred at a relatively great distance to a further protective film by their adhesive side by means of a roll operating with a vacuum and, in a following station, have an already separated label stuck over them. For this purpose, the continuous circumferential speed of the roll is matched to the conveying speed of the other protective film. Disadvantageous in the case of the known device is, firstly, the fact that expulsion of defective security elements is not provided. In addition, the first protective film has to be wound up. In addition, the security elements have to be ready-made with an adhesive layer in a preceding operating process and have to be separated. The adhesives employed are costly, so that increased costs result in the event of a defective security element. Furthermore, joining the security elements to the labels is carried out by the security elements already stuck onto the protective film having an individual label stuck over them, which leads to unfavorable tolerances. Overall, the already separated labels are difficult to handle.

WO-A-99 00 784 describes a device for producing labels provided with transponders, in which security elements wound up on a supply roll, provided with an adhesive layer and arranged immediately adjacently on a protective film at a relatively great distance are transferred to a further protective film by their adhesive side and, in a following station, have an already separated label stuck over them. Although discontinuous operation is possible, the latter requires complicated web-edge control. Besides, the known device at the same time has the disadvantages listed above.

DE-A-197 22 327 describes a device for producing a multilayer label, which provides a carrier web provided with an adhesive layer on one side with portions of a coating web that are drawn off from a supply roll, the separation of the portions from the coating web being carried out by means of a cutting roll during the assembly or shortly before the assembly. Since the carrier web is delivered at a preset speed, the separated portion in each case has to be accelerated to the speed of the carrier web. In this way, only comparatively low delivery speeds are possible with still tolerable tolerance fluctuations. Checking and elimination of faulty portions is not provided, as a result of which faulty parts have to be separated out, with higher costs, only during the checking of the multilayer label.

Also known from practice is a method for producing cards equipped with a transponder, in which the transponder is arranged in an intermediate layer of a plastic card blank and the plastic card is then produced by lamination. This method permits the production of a data carrier with a long lifetime, which is barely sensitive to mechanical damage, but gives rise to high costs and, consequently, is not suitable for disposable applications.

It is the object of the invention to provide a method for producing data carriers equipped with integrated transponders, in which the transponders are supplied in a transponder web and are covered on one side with a label, and an apparatus for producing data carriers equipped with an integrated transponder, including apparatus for supplying a first web of labels and apparatus for supplying a first web of transponders adjoining one another. The method and apparatus permit reliable and cost-effective production of data carriers equipped with an integrated transponder.

In the case of the method, this object is achieved according to the invention in that the transponders are separated and aligned before being assembled with an associated label. In the case of the apparatus, this object is achieved, in that a joining station for cutting and separating the transponders from the transponder web is provided, which divides the transponders from the web, separates them and transfers them individually to the label web.

Data carriers in the sense of the invention can be labels provided with an adhesive layer which, for example, have a side which can be written on or printed on and which are advantageously suitable for addressing items of mail or providing goods with written labels. Furthermore, the data carriers can also be configured in the manner of cards or tickets which are used without being adhesively bonded, for example entry cards for a theater or cinema, bus tickets or else customer cards in the manner of credit cards or employee cards which, for example, at the same time check the legitimation of access into specific rooms in a company in a wire-free manner.

The method according to the invention makes it possible to separate the transponders from a rolled-up transponder web even before they are joined to the label web, as a result of which different dimensions of label and transponder can be combined with one another. In particular, it is possible to position the transponder at a predetermined location on the associated label, for example centrally or in the region of one corner. The transponders can therefore be arranged closely adjacently on the transponder web, as a result of which the space available is used beneficially.

The label web is preferably a single-sided adhesive paper web. Alternatively, however, a self-adhesive film of plastic can also be used. In particular, the label web considered is an already printed web which, for example, shows preprinted areas to be filled out or a product designation.

Before being assembled with the label, the transponders are preferably checked for function, in order to prevent the joining of an unserviceable transponder to a label in good time. The result of the functional check decides whether the transponder cut from the transponder web some cycles later as the foremost transponder is fed to the label or is separated out as a poor part. In this way, it is advantageously possible, very early in the value creation chain, to keep defective transponders from further processing. In particular if the data carriers are individualized or personalized in a special way in such a way that each data carrier is unique and does not have a duplicate, this ensures that it is not necessary to take considerable trouble to replace error-afflicted data carriers provided with an integrated transponder. The transponders expelled can likewise be supplied to post-processing, which is generally no longer possible following processing to form a finished label.

It is possible to provide an intermediate cut before the separation of the transponder, with which a portion of the transponder web which is provided between two adjacent transponders is cut out of the transponder web and supplied to the waste container. The portion is carried away like a poor part and if a poor part is carried away, preferably without being separated from the defective transponder. Providing an intermediate cut makes it possible to reduce the weight of the data carriers as far as possible and, at the same time, also to process those transponder webs which have greater distances between the transponders than absolutely necessary.

For the production of the joint between label and transponder, the transponder web is preferably supplied radially to a transfer roll, on which the foremost transponder(s) is/are held and the foremost transponder is cut to length from the transponder web. Separating only the foremost transponder in each case ensures that the guidance of the transponder web over pairs of rolls and the like remains unaffected by the cutting operation. For the separation, the transponder web supplied is in each case stopped.

The transfer roll is preferably designed as a hollow roll, to whose inner side to some extent a positive pressure and to some extent a negative pressure is applied, the locally prevailing pressure relationships being transferred via holes in the hollow roll to the transponder or the transponder strip resting on the holes. In particular, in this way the foremost transponder is attracted against the hollow roll by the negative pressure acting through the holes and can carry out a pivoting movement of about 90° even without a backing roll.

In this way, the foremost transponder separated from the transponder web is displaced into a position in which its leading edge is located substantially parallel to the course of the label web, care being taken at the same time that the leading edge of the transponder is arranged at least at the same height at which the transponder is to be applied to the label in an accurate position. For the purpose of contact between label web and transponder, a pressure roll is fed against the printed side of the label web, in the direction of the hollow roll, so that the adhesive side of the label web, facing the hollow roll, touches the front butt edge of the transponder and carries the latter with it during a subsequent displacement of the label web. The pressure roll is displaced in the direction of the roll only until the transponder has been picked up from the hollow roll by the adhesive side of the label web, which prevents the adhesive side coming into contact with the hollow roll.

In order to control the advance of the transponder web precisely, the position of the transponder web is preferably checked by using markings which, if appropriate, are at the same time constituent parts of the transponder, for example optically or inductively in a position monitoring station. If, given a known transponder spacing on the transponder web, the position monitoring station is placed sufficiently close to the transfer to the label web, reproducible supply of the transponders with sufficient accuracy can be ensured. In the event of overshooting or undershooting the appropriately provided marking, provision is expediently made for the supply of the transponder strip to be corrected appropriately. Likewise, markings can be provided on the label web, even on the rear side, in order to ensure synchronization of the operating cycle.

Preferably, in a further station following the application of the transponder, a blank is separated from a double-sided adhesive web and placed on the transponder, the double-sided adhesive covering at least the area of the transponder. It is possible to keep the area outside the transponder free of double-sided adhesive if this label area is designed to be adhesive in any case. However, it is alternatively possible to provide an overlap of the double-sided adhesive, for example in order to increase the tolerances or to achieve a gradual transition in the thickness of the label formed with transponders.

As a rule, the double-sided adhesive will be supplied in an endless web and from the latter, preferably in a cutting and transfer station, in each case only one blank will be separated, which is just required for the label guided past the station. This prevents an endless strip of double-sided adhesive having to be brought together with the label in an operating station, which is in particular therefore advantageous since, in the event of disruptions in the area of the cutting and transfer station with double-sided adhesive, considerable contamination of this operating station may put the latter out of operation permanently.

Cutting the transponder from the transponder web or the double-sided adhesive blank from the double-sided adhesive web can be carried out with any desired cutting means, for example by means of a cutting roller, punch knife, laser and the like. Provision is preferably made in this case for the web to be cut to be at a standstill during the cutting, it being possible for the standstill time to be very short. This results in the method for producing the labels formed with integrated transponders not being a continuous method but a cycled method, in which the displacement of the label web, on the one hand, of the foremost transponder separated from the transponder web, on the other hand, and of the blank which was separated from the double-sided adhesive web, is synchronized. The method likewise permits a high operating speed of far above 100 cycles or clock periods per minute.

In order to permit the synchronization of the operations of joining the transponder to the label web and the blank to the transponder, the station in which the blank is cut off and applied is preferably designed such that it can be displaced in the direction of the label web, so that in the event of label sizes or intervals between the transponders on adjacent labels changing, the blanks can be applied in synchronism at the correct location, without the entire rear side of the label having to be covered by a double-sided adhesive web for this purpose.

According to a particularly preferred development of the invention, it is possible to laminate the label web provided with transponders onto a substrate, it being possible for the joint to the substrate to be made optionally by means of the adhesive layer of the label web projecting beyond the transponder, an additional adhesive layer of the type described above and/or an adhesive layer arranged on the substrate. The substrate, which preferably consists of board or plastic, permits the creation of a data carrier which is configured in the manner of a customer card, a bus ticket or a car park ticket, is configured in particular for only short-term use and likewise has a transponder.

The data carrier web with integrated transponders produced by the method according to the invention has, as a particular innovation, the fact that it consists exclusively of labels with serviceable or functionally checked transponders, and that none of the data carriers has subsequently been detached from the continuous web or inserted into the latter again. This makes it possible to arrange the data carriers on the data carrier web very closely, in a space-saving manner, without having to have any regard to the subsequent separation of data carriers with defective transponders. This advantageously means that a high packing density of the data carrier web produced is achieved.

Further advantages and features of the invention emerge from the following description and from the dependent claims.

The invention will be explained in more detail below by using a preferred exemplary embodiment and with reference to the attached drawings.

Figure 1:
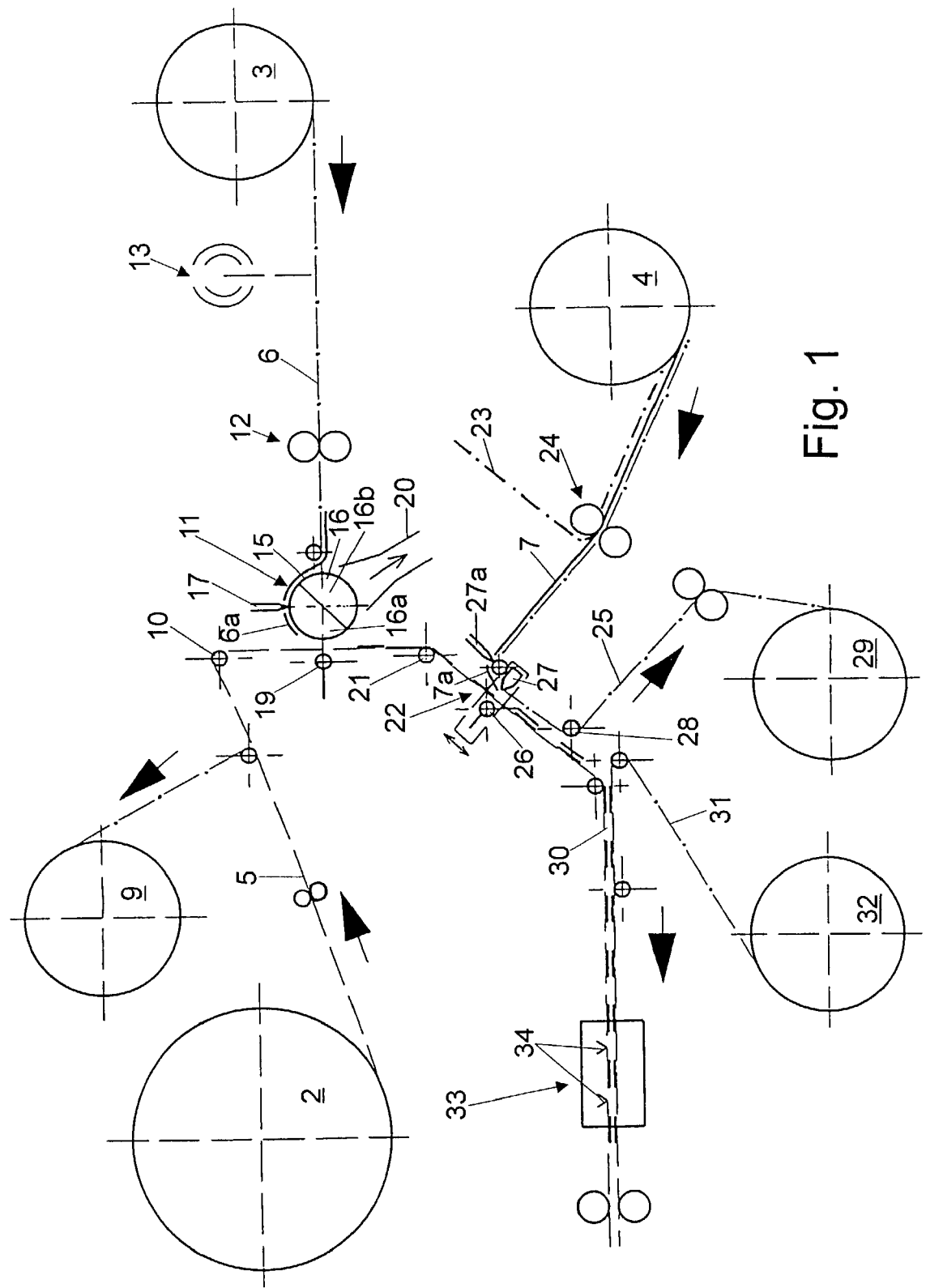
FIG. 1 shows in schematic form a preferred sequence and construction of an apparatus according to the invention for producing self-adhesive labels.

The apparatus for producing self-adhesive labels equipped with an integrated transponder, designated overall by reference symbol 1, comprises a first roll 2, on which an endless web 5 of labels is wound up, a second roll 3, on which an endless web 6 of transponders is wound up, and a third roll 4, on which an endless web 7 of double-sided adhesive is wound up. The endless label web 5 is designed to be self-adhesive on its rear side and, in the roll 2, is provided with a protective film 8 of silicone, which pulled off the label web 5 and wound up into a roll 9. The label web 5 comprises a large number of optionally printed or unprinted labels, it being possible for the labels already to be individualized by the imprint provided, for example a photo, a number or the like. The label web 5 is supplied over a deflection roller 10 to a joining station, designated overall by reference symbol 11, which will be explained in more detail further below. In order to prevent inadvertent unwinding of the web 2, further guide and deflection rolls (not illustrated) are provided. In the present exemplary embodiment, the guide and deflection rolls are as a rule driven in a known manner, without this being mentioned in each case.

The joining station 11 is likewise supplied with the endless transponder web 6, which is pulled off the roll 3 by means of a pair of guide rolls 12. The transponder web 6 comprises a large number of transponders provided one after another on a plastic web, in particular one made of polyester because of the beneficial tensile strength of the material. The transponders have an antenna web which is formed on the plastic and which, for example, can be connected by bonding to a microchip likewise arranged on the plastic, and then permits exchange of data without contact with appropriately designed writing and/or reading devices. The non-contact transponder technology as such is known and therefore does not require any specific description.

Before reaching the joining station 11, the transponder web 6 passes a transponder testing device 13, in which the transponders of the transponder web 6 are checked individually for function. The transponder testing device 13 is expediently shielded in such a way that it always checks only the transponder just located in the area of the testing device 13. The result of the test is transmitted to a controller (not illustrated) belonging to the apparatus 1, in order that possibly defective transponders can be separated out in the area of the joining station 11, as will be explained in more detail further below.

In addition, position monitoring devices 14 are provided in the area of the transponder web 6, which in the simplest case register the outermost conductor track of each transponder and therefore permit a statement about the accuracy of supply of the transponder web 6.

The joining station 11 comprises a hollow roll 15, which is seated on a cylinder 16 such that it can be driven and to which it is connected via holes 15a in the hollow roll 15. The cylinder 16 is subdivided into two chambers 16a, 16b, of which one 16a has a negative pressure with respect to the ambient atmosphere and the other 16b has a positive pressure, for example via a vacuum pump (not illustrated). In the present case, the chambers 16a, 16b divide the cylinder 16 into halves, but can also, for example, be designed such that two thirds of the circumference of the cylinder is divided off with a negative pressure and one third with a positive pressure.

The joining station 11 further comprises a cutting unit 17, which can be driven by the controller to carry out a cutting movement and which is driven in such a way that, at an instant during which the pulling-off movement of the transponder web 6 is stopped, it cuts just one, namely the foremost, transponder 6a to length from the transponder web 6. The cutting unit 17 can be designed as a cutting wire, as a knife which can be displaced transversely with respect to the transponder web 6, as a bar knife or else as a cutting laser or other cutting means. The portion 6a separated from the transponder web 6, which in the general case will have a single transponder 6a, is held on the hollow roll 15 by the holes 15a provided in the latter and the suction effect transmitted through said holes. It is therefore possible to supply the transponder 6a in an accurate position and attitude to the label web 5 guided past the hollow roll 15.

Figure 2:
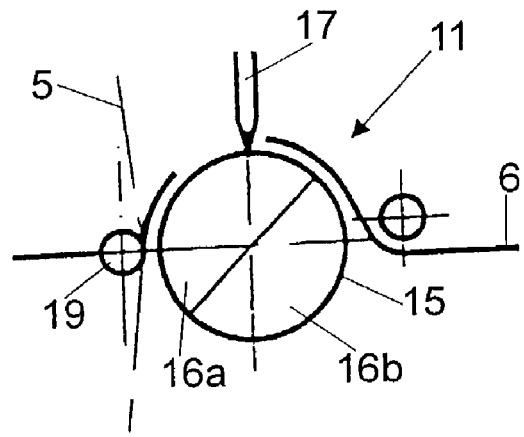
FIG. 2 shows the joining station from FIG. 1 at a later time in the operating cycle.
Figure 3:
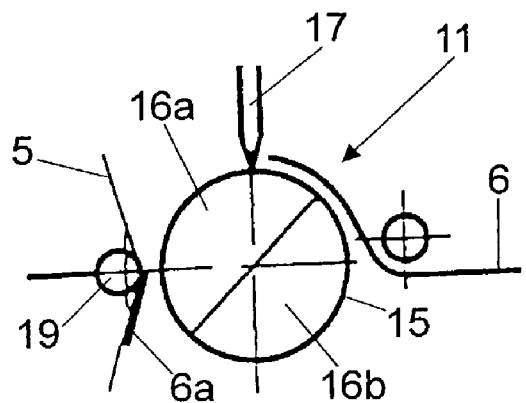
FIG. 3 shows the joining station from FIG. 2 at a still later time in the operating cycle.
Figure 4:
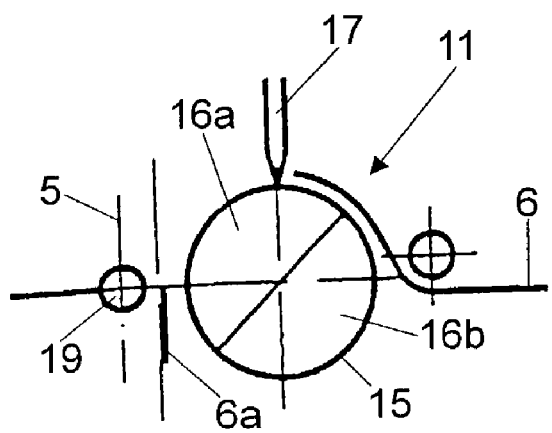
FIG. 4 shows the joining station from FIG. 3 at a still later time in the operating cycle.

The label web 5 is guided past the hollow roll 15 with its adhesive side facing the latter. If, on the basis of the test in the transponder testing station 13, the transponder 6a about to be joined to the next label was found to be serviceable, the separated transponder 6a is initially displaced by the hollow roll 15, as shown in FIGS. 2 to 4, in the direction of such a position in which the end of the transponder 6a extends substantially parallel to the label web 5. A pressure roll 19 belonging to the joining station 11 is then displaced in the direction of the hollow roll 15 and has the effect that the end of the separated transponder 6a comes into contact with the adhesive surface of the label web 5 facing said transponder, simultaneous rotation of the hollow roll 15 for support being possible but not absolutely necessary. However, during rotation of the hollow roll 15, it is already possible to advance the transponder web 6 for the next step. The transponder 6a is held by the adhesive side of the label web 5 and, with the label web 5, is led through the pair of rolls 19, 15, and a joint is produced between the two aforementioned parts. Following this, the pressure roll 19 is pulled back again into its initial position shown in FIG. 1.

If the controller reports that there is a defective transponder 6a, on the basis of a fault message from the testing device 13, instead of triggering the pressure roll 19, the defective transponder 6a is rotated further through 180° together with the hollow roll 15, where the pressure side of the cylinder 16 acts on the holes 15a in the hollow roll 15 and throws the transponder 6a to be separated out into a waste vessel 20, which is under a slight negative pressure.

By checking the transponders before the separation, and selective driving of the joining station 11 on the basis of whether the transponder 6a is to be joined to a label on the basis of the test result or is to be separated out, it is possible to join only serviceable transponders 6a to a label from the label web 5 in each case, and therefore to prevent costly waste production.

It can be seen that the labels, at least in one direction, can have a substantially greater extent than the transponders. Separating a transponder 6a from the transponder web 6 makes it possible to arrange the transponder web with a high packing density on the roll 3, without having to match the spacings of the transponders in the transponder web 6 to the length of the labels on the label web 5.

The label web 5 provided with the transponders is supplied over a deflection roller 21 to a further operating station 22, which can be displaced on a carriage or the like in the direction of the movement of the web 5, in order to be able to coordinate it cycle by cycle with the dimensions of the labels 5 or of the transponders 6a and the transfer cycles of the transfer station 11.

The operating station 22 is supplied with the double-sided adhesive web 7 which is wound up on the roll 4. A first protective film 23 is pulled off downstream of a pair of driven guide rolls 24 and stored on a roll (not illustrated). From the double-sided adhesive web 7, which is provided on one side with a further carrier film 25, in the area of the station 22 in each case a blank 7a is cut from by means of a cutting means designed as a cutting roller 27a and is stuck onto the side facing away from the label web 5 of the transponder 6a adhering to the label 5. The blank 7a is in this case guided over a projection 27 oriented toward the carrier film 25, at the same time a pressure roll 26 pressing against the label web 5 in such a way that the blank 7a covers the transponder 6a on the label web 5.

It should be noted that the blank 7a is cut off the double-sided adhesive web 7 immediately before being applied. This ensures, firstly, that the cut once performed does not run astray again, because of the material consistency of the double-sided adhesive, and does not effect an undesired joint between the blank 7a and the double-sided adhesive web 7. Furthermore, it is ensured that, in the event of disruptions in the area of the operating station 22, only one blank 7a of the double-sided adhesive remains, as a result of which the effort on maintenance and cleaning is correspondingly reduced.

As it leaves the station 22, the carrier film 25 is deposited on a storage roll 29 via a deflection roll. The web 30 produced on the basis of the operating steps described above and comprising self-adhesive data carriers with integrated transponders is covered on its adhesive side with a substrate, in the present case a protective film 31 of silicone, which is pulled off a roll 32, the resulting web being smoothed in an equalizing station 33. The web 30 can be wound up into a roll again without any further functional testing. Provided in the equalizing station 33 are punch units, indicated by reference symbol 34, which punch the label out of the web 30 or at least begin to cut it to such an extent that the labels, which can have any desired outer contour, can be detached easily from the protective film 31.

The method outlined above ensures that no defective transponders are incorporated into the data carrier web 30 produced, which would entail complicated separation and correction and subsequent rejoining of the data carrier web 30.

The apparatus 1 operates in a cycled manner, that is to say during each cycle—assuming that there is a serviceable transponder 6a to be joined to the label web 5—a label is guided into the area of the station 11 and there, if necessary, is positioned by means of small steps. For this purpose, the deflection rolls can be driven. At the same time, in each case a blank 7a is applied to the label web 5 in the station 22, the operating cycle of the apparatus 1 being synchronized for this purpose. Since very accurate positioning for the cut is required for punching out in the area of the equalizing station 33, in order to control the synchronized advances of the webs 5, 6, 7 and 30, a printed image recognition means provided there can be used.

Following the equalization station, the data carrier web 30 can also be perforated and folded.

Figure 5:
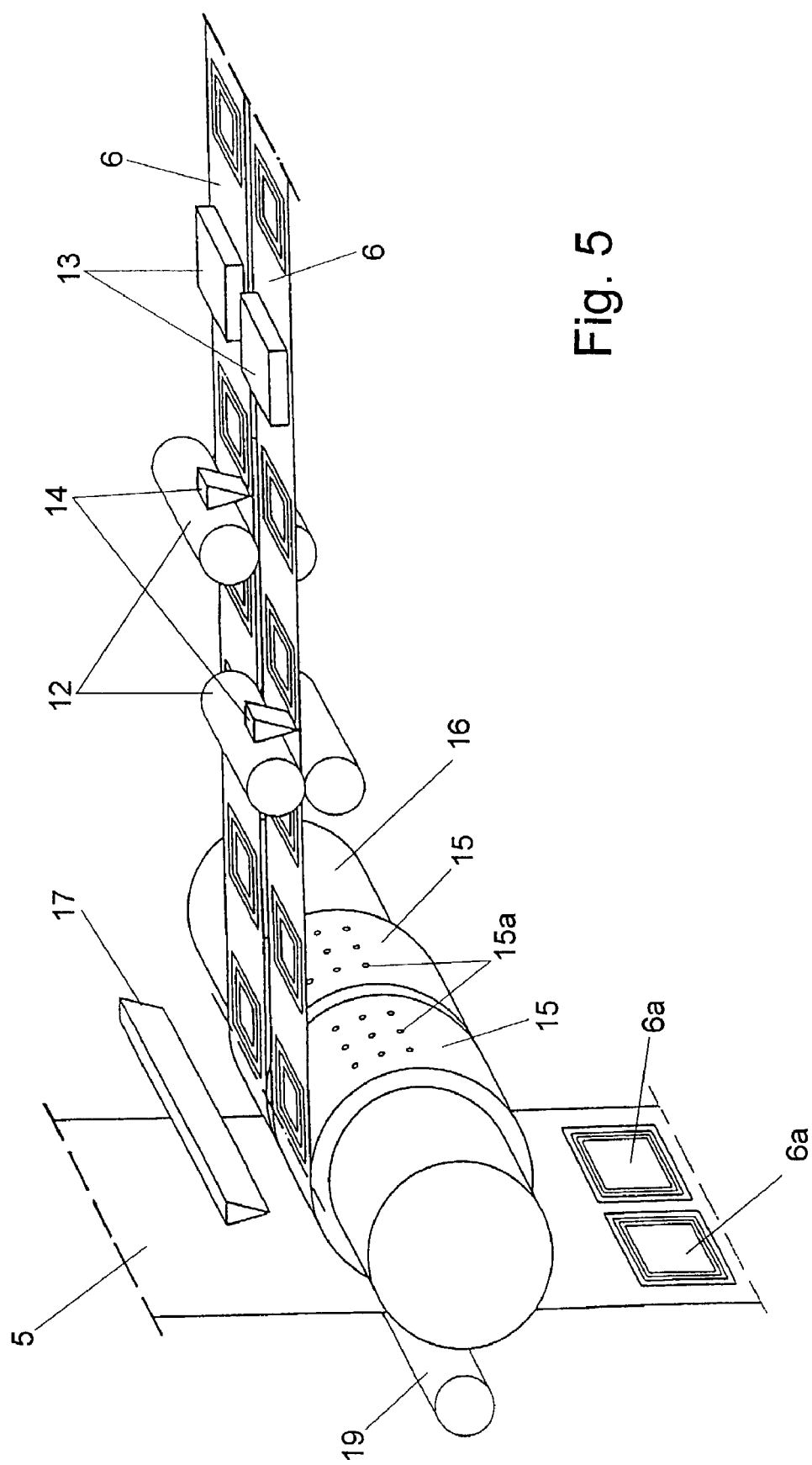
FIG. 5 shows a perspective view of a detail of a modified exemplary embodiment of the apparatus according to the invention.

The production of the data carrier web 30 has been explained above using an exemplary embodiment in which in each case a single transponder 6a was applied to a label web 5. However, it is also possible to supply a multiplicity of transponder webs 6 parallel to one another to the joining station 11, the transponders 6a being pulled off an appropriate number of rolls 3 as webs 6, and to apply the transponders 6a as desired to a common or to two likewise parallel-guided label webs 5, cf. FIG. 5. It has to be understood that, in the event of a defective transponder, the transponder web 6 associated with this is pulled forward and separated on its own before it reaches the cutting unit 17 and is subsequently carried away into the waste vessel 20, while for the transponders found to be serviceable, the transponder webs 6 are stopped and are thus not advanced. The delays which occur as a result in the parallel webs 6 are small and impair the joining of the transponders 6 to the label web 5, again proceeding in synchronism, either not at all or only to a negligible extent. Likewise, an intermediate cut can be provided, in which a portion in each case provided in the transponder web 6 between two adjacent transponders is separated in the station 11 and supplied to the waste container 20. In the case of a plurality of parallel transponder webs, this is expediently carried out simultaneously in each case. In the event of the simultaneous parallel production of a plurality of data carriers, the joining is preferably carried out to a unitary label web 5, which is cut longitudinally as required to form a plurality of data carrier webs only in the area downstream of the equalizing station 33 and after the edge has been stripped off. In addition, the double-sided adhesive blanks 7a are then preferably supplied on a common carrier film having a plurality of strips of double-sided adhesive if required.

It is therefore advantageously possible to join a plurality of transponders 6a simultaneously to one or more label webs 5 in the joining station 11, the transponder webs 6 supplied simultaneously at the cycle rate, and also the double-sided adhesive webs 7, being driven synchronously. It has to be understood that, if appropriate, the means required above for a single data carrier web 30 have to be provided many times in accordance with the number of webs to be produced, but for this purpose, the joining station 11 is advantageously and cost-effectively needed only once. Up to 5 tracks are preferably provided for the simultaneous supply of transponder webs. In a corresponding way, the apparatus 1 can be employed universally for small-format data carriers in just the same way as for large-format data carriers.

The invention has been explained above by using an exemplary embodiment in which the data carriers produced are labels. Equally well, however, data carriers in the shape of cards in credit card format or in another format can be produced, by the resulting web 30 being applied to an endless plastic or board web as a substrate in a lamination station arranged upstream of the equalizing station 33. The adhesive joint can be produced by means of the double-sided adhesive blank 7a provided on the web 30, but alternatively also by the adhesive excess area of the label 5 or by an adhesive surface of the substrate, which means that the station 22 can be dispensed with. If a security adhesive is used, the card can be employed at low costs as an identification card or the like which is safe against destruction. Likewise, the substrate can consist of paper. In the case of plastic cards, punching out the data carriers and subsequent stacking can follow the equalization. The card produced in this way is substantially more economical to produce than a laminated card. If, for example, board or paper is laminated, a data carrier equipped with a transponder which is produced has a configuration comparable to a conventional ticket or label and can therefore be processed in all automatic machines designed for this purpose and, for example, processing rolls or continuously folded products. A preferred application for such a ticket is, for example, intelligent bus or subway train tickets. A preferred application for a self-adhesive data carrier is, for example, cards to accompany items of mail or price labels in a supermarket.

The invention claimed is:

1. A method for producing data carriers equipped with integrated transponders, comprising:
   (a) supplying the transponders in a transponder web,
   (b) testing the transponders for function, separating and aligning them,
   (c) selectively expelling unserviceable transponders from production after the transponders are separated while the transponder web is stopped;
   (d) immediately thereafter permanently assembling only remaining serviceable transponders with a corresponding labels to become said data carriers; and
   (e) wherein the testing step of the transponders and the assembling step of transponder and label are carried out substantially simultaneously.

2. The method as claimed in claim 1, wherein the label is carried in a label web, and wherein a pressure roll presses the label web in the direction of the transponder which has been separated and which is held in alignment with the label.

3. The method as claimed in claim 1, wherein every transponder is cut from the transponder web, and wherein the cutting step, the testing step and the assembling step are substantially carried out at the same time.

4. The method as claimed in claim 1, wherein the transponder web comprises a plurality or adjacent transponders, wherein each of said plurality of adjacent transponders is cut from the transponder web, and wherein each serviceable cut transponder is assembled with a corresponding label immediately after the cut.

5. The method as claimed in claim 1, wherein the testing step of the transponder and the assembling step of transponder and label is provided in one apparatus, such that no re-assembly of the transponder web is necessary responsive to the elimination of unserviceable transponders.

6. A method for producing data carriers equipped with integrated transponders, comprising assembling transponders with labels, the labels having one adhesive side,
   wherein the transponders are supplied in a transponder web,
   wherein the transponder web is supplied radially to a transponder roll on which said transponder web is held,
   wherein the foremost transponder is cut from the transponder web,
   wherein said foremost transponder is brought into alignment with the adhesive side of the label for subsequent assembly by a rotation of the roll which is executed while the transponder web stops,
   wherein the labels are supplied in a label web spaced from said transponder roll and wherein an axially displaceable pressure roll is arranged on a side of the label web opposite the transponder roll and including moving said pressure roller to displace the label web towards the cut foremost transponder carried on said transponder roll such that the adhesive side of the label web is caused to contact the foremost transponder, and
   wherein the transponder roll is hollow and is provided with holes to connect the surface of the transponder roll with one of two chambers, the first chamber providing a negative pressure to absorb a transponder and the second chamber providing a positive pressure to repel a transponder.

7. The method as claimed in claim 6, wherein the transponder web is provided with markings which permit position monitoring and correction.

8. The method as claimed in claim 6, wherein, before being assembled with the label, the transponders are tested for function, and wherein unserviceable transponders, after being separated, are expelled from the production by a rotation of the roll.

9. The method as claimed in claim 6, wherein the label is carried in an a label web, and wherein a pressure roll presses the label web .in the direction of the foremost transponder held into alignment on the roll such that an adhesive side of the label web picks up the foremost transponder.

10. The method as claimed in claim 6, wherein a blank separated from a web of double-sided adhesive is applied to at least the transponder adhering to the label.

11. The method as claimed in claim 6, wherein a controller is connected to drives assigned to displace at least the transponder web, the roll and the label, and wherein the transponder web, the roll and the label are driven in a cyclic manner and are synchronized by the controller.

12. A method for producing data carriers equipped with integrated transponders,
   (a) supplying at least one label having one adhesive side in a label web,
   (b) providing at least one axially movable pressure roll for feeding said at least one label by displacing said label web from its normal path,
   (c) providing at least one transponder roll for supplying transponders, wherein said label web is supplied along a normal path that passes said transponder roll while maintaining a predetermined distance from said transponder roll,
   (d) displacing the pressure roll axially toward the transponder roll to thereby displace the label web in a direction normal to its normal path toward the transponder roll by said predetermined distance each time the transponder roll supplies a transponder such that the adhesive side of the label web contacts, picks up and covers a corresponding transponder to assemble the label and the transponder. to become said data carrier.

13. The method as claimed in claim 12, wherein a transponder web is supplied radially to the transponder roll on which said transponder web is held, and wherein the foremost transponder is cut from the transponder web.

14. The method as claimed in claim 13, wherein the transponder roll is provided with holes having one of a positive pressure and a negative pressure applied to the transponder roll for respectively attracting by suction and repelling the transponder web.

15. The method as claimed in claim 12, wherein a blank separated from a web of double-sided adhesive is applied to the transponder adhering to the label.

16. The method as claimed in claim 15, wherein the double-sided adhesive is supplied in an endless strip to a cutting and transfer Station, in which the double-sided adhesive covers the transponder and the label on its side facing away from a printed side of the label.

17. The method as claimed in claim 12, wherein the data carriers provided with the transponders are adhesively bonded to a substrate.

18. The method as claimed in claim 17, wherein the substrate is supplied as a web-like material to the label web provided with the transponders.

19. The method as claimed in claim 18, wherein the web-like material is selected from the group comprising plastic, paper, board and silicone.

20. The method as claimed in claim 12, wherein the data carriers produced are at least partly separated from the data carrier web by punching.

21. The method as claimed in claim 12, wherein the foremost transponder is cut on the roll from a transponder web, and wherein holes in he roll apply one of a negative pressure for retaining the transponder and a positive pressure for repelling the transponder.

22. The method as claimed in claim 21, wherein the transponder web is provided with markings which permit position monitoring and correction.

23. The method as claimed in claim 12, wherein a controller is connected to at least the roll and the pressure roller, wherein the roll and the pressure roller are driven in an intermitting manner to synchronize the label web and the transponder to be assembled, and wherein the pressure roll and the roll have opposite rotational directions.

24. The method as claimed in claim 12, further comprising a testing unit for testing the transponders for function before being cut from the transponder web, said testing unit being connected to a controller, wherein the cutting unit comprises an expulsion device, comprising the further steps of using the controller to drive the expulsion device to expel the unserviceable transponder and using the cutting unit to cut the next transponder from the transponder web when the controller detects an unserviceable transponder to be the foremost transponder such that every label is assembled with the required number of transponders.

25. The method as claimed in claim 12, wherein, before being assembled with the label, the transponders are tested for function, and wherein unserviceable transponders., after being separated, are expelled from the production by a rotation of the transponder roll.

26. The method as claimed in claim 25, wherein the transponder roll driven responsive to the result of the function test of a transponder individually expels unserviceable transponders from the production and feeds a serviceable transponder towards assembly with an associated label.

* * * * *